United States Patent
Kabel et al.

(10) Patent No.: US 9,718,530 B2
(45) Date of Patent: Aug. 1, 2017

(54) MARINE VESSEL DISPLAY SYSTEM

(75) Inventors: Darrin W. Kabel, Overland Park, KS (US); Engelhard B. Sundoro, Overland Park, KS (US)

(73) Assignee: Garmin Switzerland GmbH (CH)

( * ) Notice: Subject to any disclaimer, the term of this patent is extended or adjusted under 35 U.S.C. 154(b) by 315 days.

(21) Appl. No.: 13/448,851

(22) Filed: Apr. 17, 2012

(65) Prior Publication Data
US 2013/0271301 A1    Oct. 17, 2013

(51) Int. Cl.
| | | |
|---|---|---|
| G08B 23/00 | (2006.01) | |
| B63J 99/00 | (2009.01) | |
| B63B 49/00 | (2006.01) | |

(52) U.S. Cl.
CPC .............. *B63J 99/00* (2013.01); *B63B 49/00* (2013.01); *B63J 2099/006* (2013.01); *B63J 2099/008* (2013.01)

(58) Field of Classification Search
CPC ......... B63B 49/00; B63B 35/14; B63B 35/16; B63B 35/22; B63B 43/00; B63B 2043/006; B63B 43/18; B63B 45/00; B63B 51/00; B63B 69/00; B63B 2211/00; B63B 2203/00; B63B 2213/00; B63B 2213/02; B63B 2702/00; B63B 2733/00; B63J 99/00; B63J 2099/008; B63J 2099/006; G08B 23/00; G05B 2219/2228; G05B 2219/2233; G05B 2219/2231; G05B 2219/1215; G05B 2219/2234; G05B 2219/2237; H04N 5/04
USPC ......................................... 340/984, 987, 945
See application file for complete search history.

(56) References Cited

U.S. PATENT DOCUMENTS

| | | | | |
|---|---|---|---|---|
| 7,430,461 | B1 * | 9/2008 | Michaels | B63H 21/22 340/984 |
| 2007/0008186 | A1 * | 1/2007 | Michaels | B63B 49/00 340/945 |
| 2010/0127847 | A1 * | 5/2010 | Evans | G06F 3/04817 340/461 |
| 2011/0095914 | A1 * | 4/2011 | Velado | B63J 99/00 340/984 |
| 2013/0157647 | A1 * | 6/2013 | Kolodziej | H04M 1/72522 455/419 |

OTHER PUBLICATIONS

Northstar, Northstar 1200 Series Display Owner's Guide, pp. 1-48.*
Northstar, Northstar 6000i Quickstart Guide and Reference Manual, pp. 1-180.*

(Continued)

*Primary Examiner* — Brian Wilson
(74) *Attorney, Agent, or Firm* — Samuel M. Korte; Max M. Ali

(57) ABSTRACT

A marine vessel electronic display system includes a first display station that can include a mode selector for permitting selection of a first mode of operation and a processing system causing displays in the first display station to present information related to the selected first mode of operation. The marine vessel electronic display system may include a second display station that can include a mode selector for permitting a user to select a second mode of operation different from the first mode of operation and a processing system causing a display in the second display station to present information related to the selected second mode of operation.

27 Claims, 9 Drawing Sheets

(56) References Cited

OTHER PUBLICATIONS

Northstar, Marine Electronics 2008 Catalog, pp. 1-52.*
Volvo Penta EVC System; printout from http://www.islandpilot.com/Volvo_EVC_Spec.pdf, Jul. 2003.
Volvo Penta EVC System; printout from http://www.volvopenta.com/volvopenta/na/en-us/marine_leisure_engines/evc/Pages/electronic_vessel_control.aspx, dated prior to Apr. 17, 2012.
Raymarine E7; printout from http://www.raymarine.com/submittedfiles/e7/E7_Brochure.pdf, dated prior to Jul. 2011.
Garmin GPSMAP 6000/7000 Series Owner's Manual, Nov. 2009.

* cited by examiner

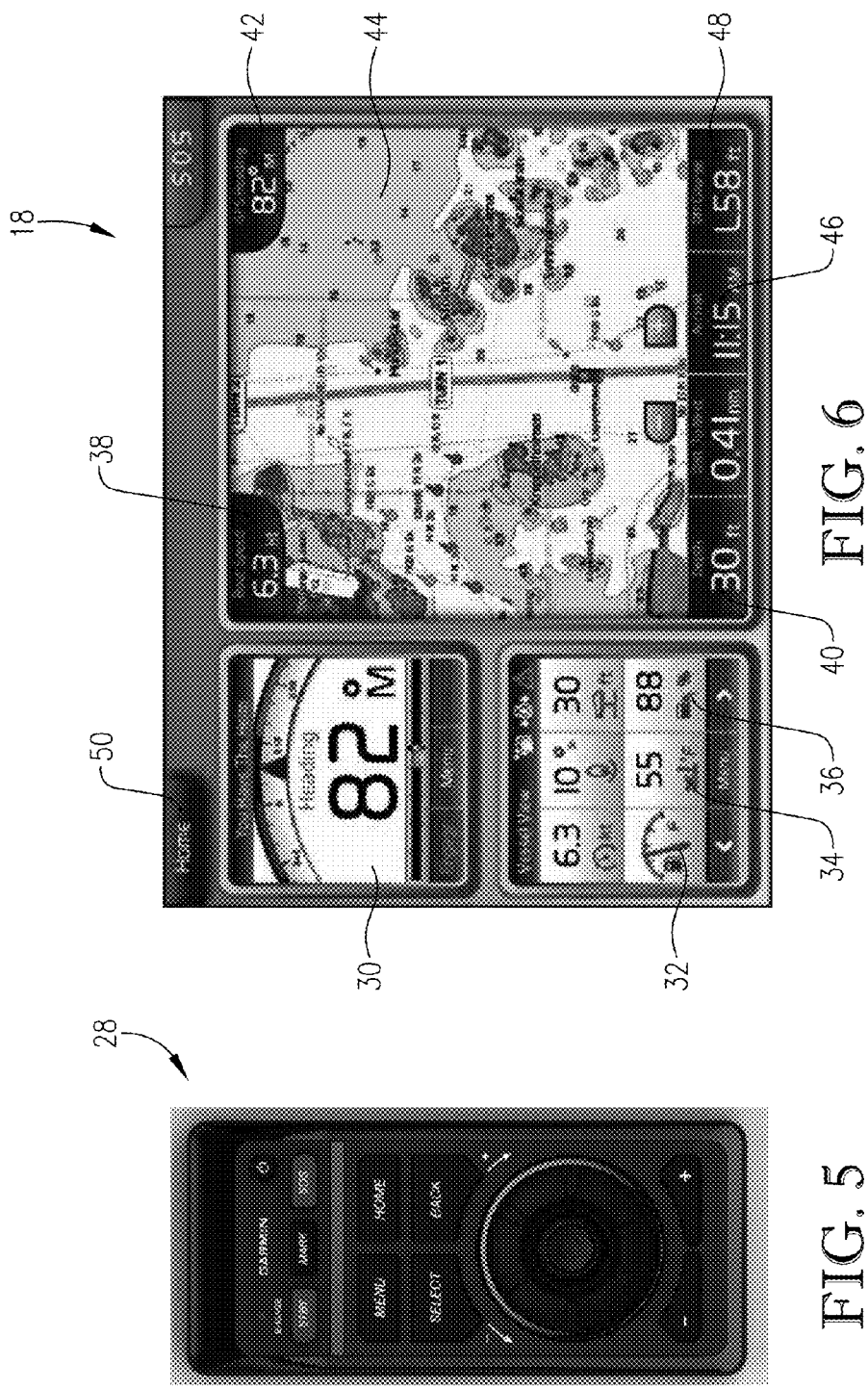

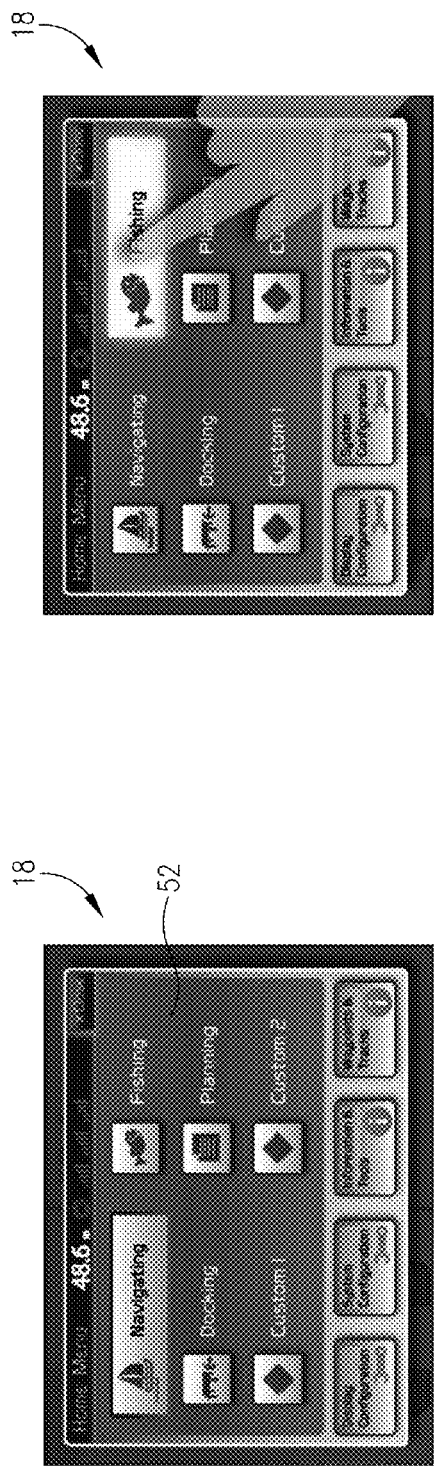
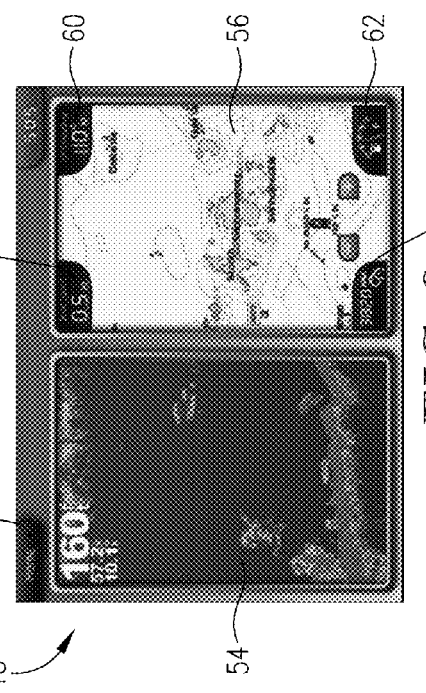
FIG. 7
FIG. 8
FIG. 9

MARINE VESSEL DISPLAY SYSTEM

BACKGROUND

Many marine vessels have numerous instruments, controls, displays and gauges for allowing operators to view cartographic maps, navigate to desired locations, locate fish and other underwater objects, monitor fuel levels and other vessel conditions, and perform other control and monitoring functions. To reduce dashboard clutter and simplify operation, many marine vessels are now equipped with one or more multi-function electronic displays that replace many of the individual instruments, controls, and gauges.

SUMMARY

Some boat operators find existing multi-function displays to be confusing and difficult to use because they present too many functions, many of which are not relevant to a current task being performed. This problem can be lessened somewhat by mounting several electronic displays in a vessel, each configured for one or more specific functions. However, this is costly and requires boat operators to monitor and control the display that is dedicated to a desired function. Moreover, existing electronic displays cannot be easily integrated, thus requiring operators to monitor and control each of the displays separately. Embodiments of the present technology provide a marine vessel display system that is easier and more intuitive to use and that more effectively integrates multiple electronic displays.

One embodiment of the technology is a display system for a marine vessel comprising an input for receiving data from a plurality of marine input sources; a display for presenting information representative of at least some of the data; a processing system coupled between the input and the display and operable to implement a plurality of modes of operation; and a mode selector for permitting a user to select between the modes of operation. When a user selects a mode, the processing system presents information representative of data from selected marine input sources on the display. This allows a user to quickly and easily monitor data related to a particular mode without being burdened with data unrelated to the mode. Associating the marine input sources into modes also allows a user to quickly and easily switch modes to monitor information representative of data from desired marine input sources.

For example, in one embodiment, the processing system may implement a docking/undocking mode in which information from a proximity sensor, wind sensor, water current sensor, rudder position sensor, video camera and an azimuth thruster position sensor is presented on the display so that a user has ready access to this information while docking or undocking. The processing system may then allow the user to switch to a navigation mode after undocking to present navigation information, fuel level information, water depth information and other information on the display while navigating to a desired location. Other input sources and modes of operation are described in the detailed description section below.

Another embodiment of the technology is a marine vessel display system comprising a plurality of independent displays configured to be mounted adjacent one another to form a display station in a marine vessel. A processing system is coupled with the displays and is operable to implement a plurality of modes of operation, and a mode selector permits a user to select between the modes of operation. When a user selects a mode, the processing system causes all the displays in the display station to present information related to the selected mode. One of the displays in the display station may include a touchscreen user interface and is designated as a primary control display. The processing system causes the mode selector and other controls to be presented on the primary control display. A user may then control all of the displays of the display station with the controls on the primary control display to more effectively integrate the displays. This allows multiple electronic displays to be used together to present information related to a selected mode of operation and to be controlled with a single control station. For example, three independent displays may be mounted together in a boat's cockpit area to form a cockpit display station. The middle display may be designated as the primary control display and may present a touchscreen mode selector. If a user selects a navigation mode of operation, all three displays may present navigation related information.

Another embodiment of the technology is a marine vessel display system comprising a first display station configured to be mounted at a first location in a marine vessel and a second display station configured to be mounted at a second location of the marine vessel. The first display station comprises a plurality of displays, one of which is designated as a primary control display. The first display station may further comprise a processing system coupled with the displays and operable to implement a plurality of modes of operation and a mode selector for permitting a user to select one of the modes of operation. The second station comprises at least one display; a processing system coupled with the display and operable to implement a plurality of modes of operation; and a mode selector for permitting a user to select one of the modes of operation. A user or users may select different modes of operation for each of the display stations so that each display station may be configured as desired. The display system may also comprise additional display stations positioned in other areas of the marine vessel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 5 is a plan view of a remote input device that may be used with the marine vessel display system of FIG. 1 or FIG. 2.

FIG. 6 is an exemplary screen display of the marine vessel display system of FIG. 1.

FIG. 7 is another exemplary screen display of the marine vessel display system of FIG. 1.

FIG. 8 is another exemplary screen display of the marine vessel display system of FIG. 1.

FIG. 9 is another exemplary screen display of the marine vessel display system of FIG. 1.

Figure 1:
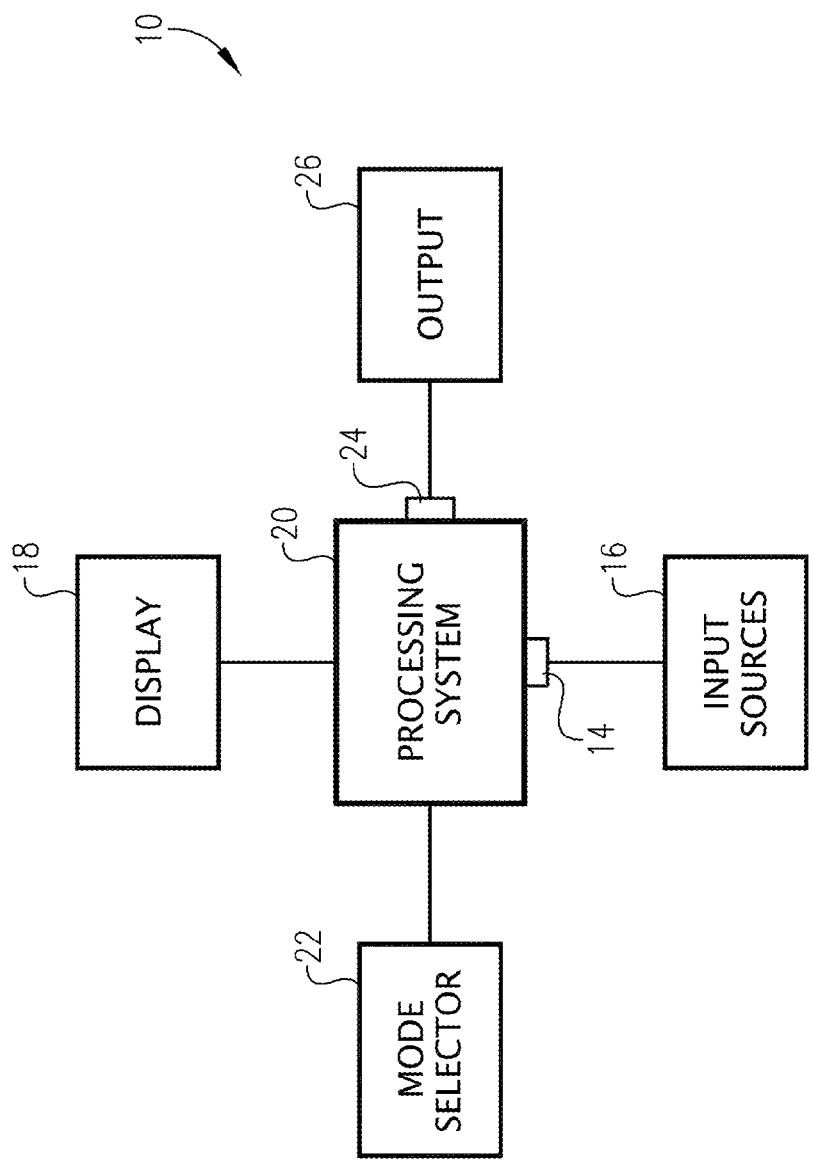
FIG. 1 is a block diagram of selected components of a marine vessel display system constructed in accordance with an embodiment of the technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of various embodiments of the present technology references the accompanying drawings which illustrate specific embodiments in which the technology can be practiced. The embodiments are intended to describe aspects of the technology in sufficient detail to enable those skilled in the art to practice them. Other embodiments can be utilized and changes can be made without departing from the scope of the technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide a display system for a marine vessel that is easier and more intuitive to use. The display system implements a plurality of modes of operation, each of which presents information representative of data from selected marine input sources on an electronic display. This allows a user to quickly and easily access data related to a particular mode without being burdened with data unrelated to the selected mode and without having to locate and monitor multiple individual instruments, gauges, read-outs, etc. This also allows a user to quickly and easily switch between modes of operation to monitor information related to other operating modes.

Embodiments of the technology also provide a marine vessel display system that includes a plurality of independent displays mounted adjacent one another to form a display station. One of the displays in the display station includes a touchscreen user interface and is designated as a primary control display. A processing system coupled with the displays implements a plurality of modes of operation as described above and presents a mode selector and a station control center on the primary control display. Importantly, a user may switch between the operating modes and otherwise control all of the displays in the display station from the primary control display so that all the displays in the display station act as a collective unit. This allows a vessel owner to install several electronic displays in a vessel and to integrate the displays so they work together to display information related to selected modes of operation.

Other embodiments of the technology provide a marine vessel display system in which multiple display stations as described above are mounted in different locations of a marine vessel to permit boat operators to access data from several locations. For example, a first display station may be mounted in the cockpit of a marine vessel and a second display station may be mounted near an aft station of the same marine vessel. A user or users may select different modes of operation for each of the display stations so that each display station may be configured to monitor particular marine input sources. Configuration data, user preferences, and other data and information provided to one of the display stations may be shared with all the display stations to ensure users are provided with current information at all the stations or such data and information may be specific to each station. This allows a vessel owner to install and configure multiple display stations in a way that best suits the way the vessel is operated and used.

Figure 4:
FIG. 4 is a perspective view of an exemplary electronic display that may be used in the marine vessel display system of FIG. 1 or FIG. 2.
Figure 3:
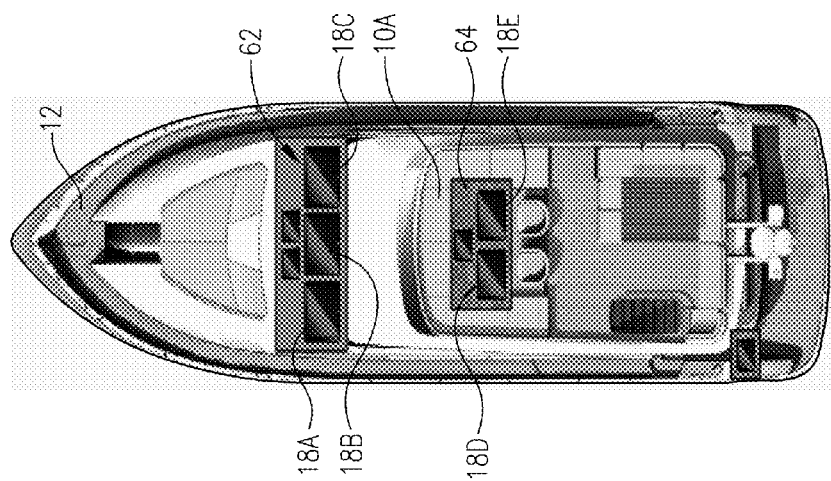
FIG. 3 is a schematic plan view of an exemplary marine vessel in which embodiments of the marine vessel display system may be installed.

Turning now to the drawing figures, a marine vessel display system 10 constructed in accordance with exemplary embodiments of the present technology will now be described in more detail. The display system 10 is configured for mounting in a boat or other marine vessel 12 as shown in FIG. 3 for assisting boat operators and other users in monitoring information related to the operation of the marine vessel 12. FIG. 1 illustrates one embodiment of the display system 10 and broadly comprises an input 14 for receiving data from a plurality of marine input sources 16; a display 18 for presenting information representative of at least some of the data from the marine input sources 16; and a processing system 20 coupled between the input 14 and the display 18. An embodiment of a display 18 is illustrated in FIG. 4. As described in more detail below, the processing system 20 implements a plurality of modes of operation, each of which causes the display 18 to present information representative of data from selected ones of the marine input sources 16 and in selected formats. The display system 10 also comprises a mode selector 22 for permitting a user to select between the modes of operation and one or more outputs 24 for coupling with one or more output devices 26.

The input 14 may be any wireless or wired device or devices for receiving data from the input sources 16 and transferring it to the processing system 20. The input 14 may comprise, for example, one or more Ethernet ports, USB Ports, memory card slots, video ports, radio frequency (RF) receivers, infrared (IR) receivers, Wi-Fi receivers, Bluetooth devices, etc.

The marine input sources 16 provide data to the processing system 20 and may comprise any measurement devices, sensors, receivers, or other components that sense, measure, or otherwise monitor components of the marine vessel 12 or its surroundings. For example, the marine input sources 16 may include sensors that measure or sense vessel fuel level, wind speed, wind direction, vessel temperature, ambient temperature, water current speed, rudder position, an azimuth thruster position, water depth, boat water storage level, anchor status, boat speed, and the like. The marine input sources 16 may also include an integrated or external sonar sounder coupled with a sonar transducer and an integrated or external radar scanner or other proximity sensor.

The marine input sources 16 may also include transmitters, receivers, transceivers, and other devices that receive data from external sources. For example, the marine input sources 16 may include an integrated or external weather receiver for receiving weather data from a weather source and/or a global positioning system (GPS) receiver or other satellite navigation receiver for receiving navigation signals.

The marine input sources 16 may also comprise a receiver or other device for communicating with transmitters or other devices worn by passengers on the marine vessel 12 to warn of "man overboard" emergencies. The marine input sources 16 may also comprise a security system for monitoring doors, windows, and other parts of the marine vessel 12 against break-ins and one or more cameras for providing video and/or other images of the vessel and/or its surroundings. The marine input sources 16 may even comprise one or more computers and/or handheld electronic devices that may be used to transfer data to the display system 10.

The marine input sources 16 may be integrally formed with the display system 10, may be stand-alone devices, or may be a combination of both. For example, the sonar sounder may be integrated into the display system 10 or may be an external sounder module. Similarly, the radar scanner may be integrated into the display system 10 or be an external device. The marine input sources 16 may be operated and adjusted using controls on the display system 10 or may have their own controls.

The display 18 is coupled with the processing system 12 and is configured for displaying text, data, graphics, images and other information representative of data from the marine input sources 16 and other sources. The display 18 may be a liquid crystal display (LCD), light-emitting diode (LED) display, light-emitting polymer (LEP) display, thin film transistor (TFT) display, gas plasma display, or any other type of display. The display 18 may be backlit such that it may be viewed in the dark or other low-light environments. The display may be of any size, and in one embodiment, is 15", 17" or 19" in diagonal. In some embodiments, the display 18 includes a touchscreen control system. The touchscreen control system may use any touchscreen technology such as resistive, capacitive, or infrared touchscreen technologies, or any combination thereof.

The processing system 20 controls the presentation of information on the display 18 and performs other functions described herein and can be implemented in hardware, software, firmware, or a combination thereof. The processing system 20 may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein.

The processing system 20 may also include memory elements for storing instructions or data. The memory elements may be a single component or may be a combination of components that provide the requisite storage functionality. The memory elements may include various types of volatile or non-volatile memory such as flash memory, optical discs, magnetic storage devices, SRAM, DRAM, or other memory devices capable of storing data and instructions. The memory elements may communicate directly with the processing system 20, or may communicate over a data bus or other mechanism that facilitates direct or indirect communication. The memory elements may optionally be structured with a file system to provide organized access to data existing thereon.

The memory may store one or more databases that may include information about the marine vessel 12 in which the display system 10 is used, such as the vessel's length, width, weight, turning radius, top speed, draft, minimum depth clearance, minimum height clearance, water capacity, fuel capacity and fuel consumption rate. The databases may also store information related to the locations and types of navigational aids including buoys, markers, lights, or the like. In some embodiments, the information related to navigational aids may be provided by the Coast Guard or other map data sources.

The processing system 20 may implement one or more computer programs that provide the operating modes described below and that control the display of information on the display 18 as described herein. The computer programs may comprise ordered listings of executable instructions for implementing logical functions in the processing system 20. The computer programs can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can contain, store, communicate, propagate or transport the program for use by or in connection with the processing system 20 or other instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

In accordance with one important aspect of the present invention, the processing system 20 implements a plurality of modes of operation, each of which presents information representative of data from selected marine input sources 16 on the display 18. In some embodiments, the information may be presented in a desired format to minimize confusion and increase ease of use. For example, the processing system 20 may implement a pre-trip-planning mode in which information representative of trip planning data is presented on the display 18. The trip planning data may be uploaded, transmitted, or otherwise communicated to the display system 10 from an marine input source 16 and may include route planning data; waypoint data; journey plans; forecasted wind, current, storm, and/or tidal conditions; vessel fuel requirements; vessel water requirements; and other data that may be useful to an operator while planning a journey. The pre-trip planning mode permits an operator to create a journey plan or similar plan on a remote or local computer and then transfer information related to the plan to the display system 10 so it can be presented on the display 18 and accessed by an operator while operating the vessel.

The processing system 20 may also implement a boat preparation mode in which information representative of water storage data, fuel level data, hatch status data and other boat readiness data is presented on the display 18. The boat preparation mode provides information related to a boat's readiness for use.

The processing system 20 may also implement a close quarters mode in which information representative of proximity data and navigation data is presented on the display 18. The close quarters mode may be particularly useful when navigating in a harbor or other confined area when an operator needs to be aware of his vessel's location relative to other vessels and obstacles. The close quarters mode may also present information from a pilot book, local speed limits, rules, regulations, etc on the display 18.

The processing system 20 may also implement a docking/undocking mode in which information representative of proximity data, wind data, water current data, rudder position data, and an azimuth thruster position data from a proximity sensor, a wind sensor, a current sensor, a rudder position sensor, and an azimuth thruster position sensor is presented on the display 18. The docking/undocking mode permits an operator to view representations of obstacles such as stationary boats, docks, and other hazards while simultaneously monitoring wind conditions, current conditions, and the status of components on the vessel while docking or undocking the vessel.

The processing system 20 may also implement a main transit mode in which information representative of fuel level data, navigation data, water depth data, and weather data is presented on the display 18. A feature of the main transit mode is monitoring the progress of the vessel 12 against a journey plan. For example, the processing system 20 may compare information related to a desired path of transit with location data monitored while the vessel 12 is in transit to determine if the vessel is off course, has enough fuel to reach its intended destination, etc and may then display such information on the display 18. The main transit mode may also present information representative of nearby vessels, obstacles, etc.

The processing system 20 may also implement an anchoring mode in which information representative of the anchor status data, wind data, depth data, tide data, proximity data, and navigation is presented on the display 18. The anchoring mode permits an operator to find suitable locations to anchor the marine vessel 12 and alerts the operator if the anchor is dragging and/or if the marine vessel 12 is moving when it shouldn't be.

The processing system 20 may also implement an off-boat monitoring mode in which information representative of security data, anchor status data, wind data, and weather data is presented on the display 18. In some embodiments, the display system 10 may send texts, images, etc to an operator's mobile phone or computer via a cell phone connection or transmitter so that the operator may monitor the marine vessel 12 at all times.

The processing system 20 may also implement a fishing mode in which information representative of fish finder data, water temperature data, navigation data, and proximity data is presented on the display 18. The fishing mode allows an operator to view representations of fish, other boats, and hazards while fishing and to monitor water conditions to determine if they are conducive to fishing.

The processing system 20 may also implement a boat storage and transport mode in which information representative of photographic data, navigation data, and proximity data is presented on the display 18. As with the off-boat monitoring mode, the processing system may display such information on the display 18 and send it to an operator's mobile phone or computer.

The processing system 20 may also implement a man-overboard mode in which information representative of personnel location data and navigation data is presented on the display 18. The man-overboard mode displays an alert and/or sounds an alarm when any of the personnel location devices indicate that a person is distanced from the vessel 12 and may have fallen over-board. The mode may also record and display the last recorded coordinates for the person when he or she left the marine vessel 12 and may automatically send such data to the Coast Guard or other marine rescue authority.

The processing system 20 may also implement a hazard hit mode in which information representative of bilge water level data is presented on the display 18. This mode allows on operator to quickly determine if the marine vessel 12 is taking on water and the rate at which it is taking on water. The hazard hit mode also determines if a bilge pump can remove the water quickly enough to keep the marine vessel 12 afloat or if the marine vessel 12 should be abandoned. The hazard hit mode may also alert the Coast Guard or other authorities of the marine vessel's 12 position and status.

The above-described operating modes are only examples of modes that may be implemented by the processing system 20, and other operating modes, or combinations or portions of the above-described modes, may also be implemented without departing from the scope of the invention.

In addition to displaying information from selected ones of the marine input sources 16, each operating mode may present information in a particular user-selected format. For example, some of the information may be presented in the form of one or more virtual devices that mimic the appearance and/or function of a gauge, instrument, or other analog device. Each virtual device may have a unique collection of graphical and functional properties that may be configured by a layout designer and adjusted by a user. Examples of virtual devices that may be presented with the display system 10 include a chartplotter, radar screen, fishfinder, camera/video screen, digital instruments with numbers, analog instrument gauges, autopilot interfaces, and entertainment interfaces. In some embodiments, the display format may change based on a current operating mode. For example, if a user changes the selected operating mode from a first operating mode, such as a Navigation operating mode, to a second operating mode, such as a Docking, Fishing, or Planning operating modes or other operating modes, the display format may change accordingly to accommodate features relevant to the selected operating mode.

The mode selector 22 permits an operator to quickly and easily select one of the operating modes. The mode selector 22 may be any device that interfaces with the processing system 20. For example, as shown in FIGS. 7 and 8 and as described in more detail below, the processing system 20 and display 18 may present a touchscreen mode selector 22 that permits a user to select any one of the illustrated Navigation, Docking, Fishing, or Planning operating modes or other operating modes. In addition to (or instead of) the touchscreen system, the display system 10 may comprise other controls or inputs for controlling selection of the operating modes or other operations of the display system 10. For example, the display system 10 may include buttons, switches, keys, voice recognition circuitry, or any other elements capable of controlling the processing system 20.

The output 24 may be any wired or wireless port, transceiver, memory slot, or other device for transferring data or other information from the processing system 20 to the output devices 26. The output devices 26 may be any devices capable of receiving information from processing system 20 or being controlled by the display system 10 such as a marine radio, beacon, lighting system, etc.

The display system 10 may also include a remote input device 28 as illustrated in FIG. 5 for controlling and providing inputs to the processing system 20. An embodiment of the remote input device 28 is shown in FIG. 5 and includes an analog joystick, thumb wheel, mouse, or similar device for providing cursor movement and control and hard keys with pre-assigned functions such as Menu, Home, Select, and Back. The remote input device 28 is particularly useful with embodiments of the display system 10 that lack a touchscreen user interface or that include displays mounted in hard to reach locations.

In some embodiments, a remote input device 28 may provide input to the processing system 20 for content presented on more than one display 18 within display system 10. For example, one remote input device 28 may be used navigate across multiple displays to provide input for information presented on a single display 18. In embodiments where a plurality of independent displays 18 are configured to be mounted adjacent one another to form a plurality of display stations in the marine vessel 12, the remote input device 28 may provide input to the processing systems 20 for the display stations to provide input for content presented on any display included in the display stations. The remote input device 28 may include, for example, a mouse, pointer, keypad, joystick, trackpad, trackball, keyboard, combinations thereof, and the like.

The display system 10 may also include a speaker for providing audible instructions and feedback, a microphone for receiving voice commands, an infrared port for wirelessly receiving and transmitting data and other information from and to nearby electronics, and other information, and a cellular or other radio transceiver for wirelessly receiving and transmitting data from and to remote devices.

In addition to the input 14 and output 16, the display system 10 may also include a number of other I/O ports that permit data and other information to be communicated to and from the processing system 12. The I/O ports may include removable memory card slot, such as a micro SD card slot, or the like for receiving removable memory cards, such as microSD cards, or the like, and an Ethernet port for coupling processing system 20 with to another processing system such as a personal computer. Navigational software, cartographic maps and other data and information may be loaded in the display system 10 via the I/O ports, the wireless transceivers, or the infrared port mentioned above. The data may be stored in memory elements of processing system 20. In some embodiments, stored cartographic maps may be upgraded, downgraded, or otherwise modified in the background without interfering with the primary uses of the display system 10. If multiple processing systems 20 are used in display system 10, the upgrade, downgrade, or modification may be applied to all processing systems 20. Thus, for example, the various components of the system 10 may be easily upgraded, downgraded, or modified without manually and tediously installing the same data on each of the components. Such functionality also ensures data uniformity among the various components of the system 10.

The display system 10 also includes a housing that encloses and protects the other components from moisture, vibration, and impact. The housing may include mounting hardware for removably securing the display system 10 to a surface within the marine vessel 12 or may be configured to be panel-mounted within the marine vessel 12. The housing may be constructed from a suitable lightweight and impact-resistant material such as, for example, plastic, nylon, aluminums, or any combination thereof. The housing may include one or more appropriate gaskets or seals to make it substantially waterproof or resistant. The housing may take any suitable shape or size, and the particular size, weight and configuration of the housing may be changed without departing from the scope of the present invention.

The display system 10 described herein and other embodiments of the display system 10 may be used to present information for any of the above-described operating modes and other operating modes. An operator or other user may manipulate remote input device 28 or mode selector 22, which may be a touchscreen mode selector 22, to select or deselect one of the operating modes.

FIG. 6 depicts the display system 10 with a main transit or navigation mode depicted on the display 18. In this embodiment, the operating mode may present several virtual devices as well as textual and graphical information. For example, the operating mode may present a virtual compass 30 or other heading instrument, a virtual fuel gauge 32, a virtual engine temperature indicator 34, a virtual fuel level indicator 36, a boat speed indicator 38, a water depth indicator 40, a GPS heading indictor 42, a cartographic map 44 with a route shown thereon, an estimated arrival indicator 46, an off course indicator 48, and other indicators as shown.

To switch to a different operating mode, the user may press a "Home" button 50, icon, or other input on the display 18 to present a mode selector screen 52 as show in FIG. 7. The mode selector screen 52 as illustrated in FIGS. 7 and 8, presents buttons, icons, or other selectors for various different operating modes as shown. The user may communicate a touch input to a touchscreen display 18 or otherwise select any of the displayed operating modes to present information related to the operating mode. For example, the user may select a fishing mode as shown in FIG. 8 to cause the display 18 to present information tailored to the fishing mode as shown in FIG. 9. In the fishing mode, the display 18 may present a fish finder display 54, a cartographic map 56, a boat speed indicator 58, a heading indicator 60, a fuel level indicator 62, an engine RPM indicator 64, and other indicators as shown. The user may press the Home button 66 as illustrated in FIG. 9 at any time to again view the mode selector screen 52 shown in FIG. 7.

The above-described display system 10 allows a user to quickly and easily select an operating mode to view information relevant to the mode without looking for individual instruments, gauges, read-outs, etc. The display system 10 also permits a user to quickly and easily switch between operating modes to view information from other input sources. The display system 10 thus provides a user with a nearly endless amount of information on a single display while also simplifying access to the information.

Display system 10 may coordinate settings and content presented on the displays 18 in the display system 10. In some embodiments, the operating mode settings, cartographic data, and operating mode content currently associated with a display 18 may be stored in memory elements of processing system 20. The stored operating mode display settings, cartographic information, operating mode content, and any other data utilized by the system 10 may be automatically repopulated if one of the displays 18 or other system 10 component fails or if the operating mode display settings, cartographic information, and operating mode content are moved from one display 18 to another display 18. Thus, instead of requiring each of the displays 18 to be separately configured, the memory elements of the processing system 20 may automatically transfer configuration information, system data, cartographic information, and the like to the various system 10 components upon installation, reconfiguration, failure, or the like.

Figure 2:
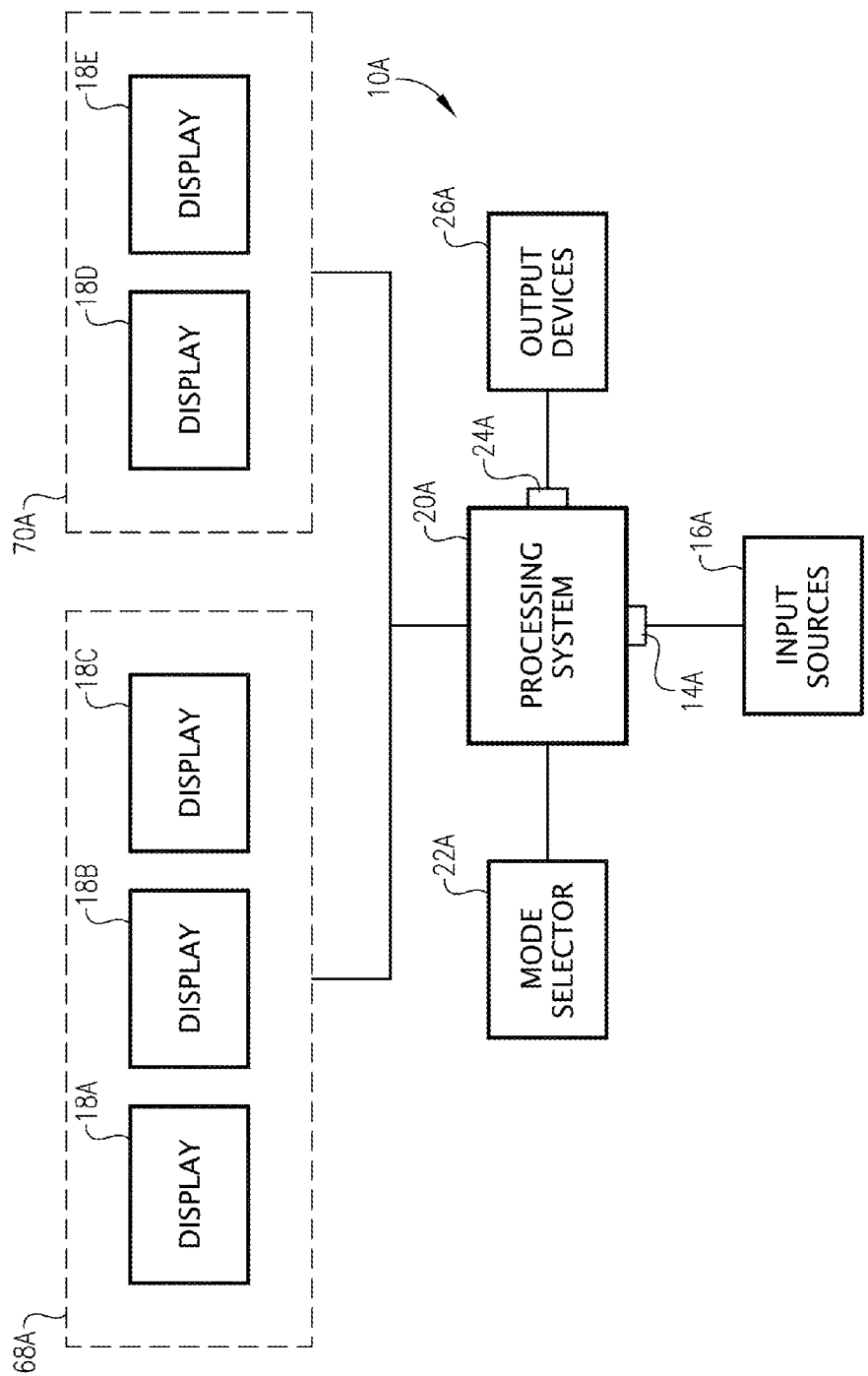
FIG. 2 is a block diagram of selected components of a marine vessel display system constructed in accordance with another embodiment of the technology.

FIG. 2 illustrates a display system 10A in accordance with another embodiment of the technology. The display system 10A is similar to the display system 10 except that it includes a plurality of independent displays 18A-E configured to be mounted adjacent one another to form one or more display stations in the marine vessel 12. For example, as illustrated in FIGS. 2 and 3, three displays 18 A-C may be mounted together to form a first display station 68A in a first area of the marine vessel 12, and two other displays 18D, 18E may be mounted together to form a second display station 70A in a second area of the marine vessel 12. The display system 10A may also include additional displays 18 grouped into one or more additional display stations.

A processing system 20A similar to the processing system 20 described above is coupled with the displays 18A-E and is operable to implement the modes of operation described above. It is to be understood that the processing system 20 may be any configuration of processors that enables communication with one or more displays 18A-E. Each display 18A-E and/or display station 68A, 70A may have a separate processing system 20A, or one processing system may control both display stations and other display stations, or any combination thereof. In some embodiments, each processing system 20A may coordinate its activities with one or more other processing systems 20A of the marine vessel display system 10. The processing system 20 may include any number of processors, micro-controllers, or other processing systems and resident or external memory for storing data and other information accessed or generated by the marine vessel display system 10. A mode selector 22A similar to the mode selector described above permits a user to select between the modes of operation. When a user selects a mode, the processing system 20A causes all the displays to display information relevant to the selected mode as described above.

In one embodiment of the technology, one of the displays in each display station 62A, 64A includes a touchscreen user interface and is designated as a primary control display. For example, the display 18B may be designated as the primary control display for the display station 68A. The processing system 20A displays the mode selector and other controls on the touchscreen user interface of the primary control display, and these controls operate all of the displays in the display station to more effectively integrate the displays.

Figure 15:
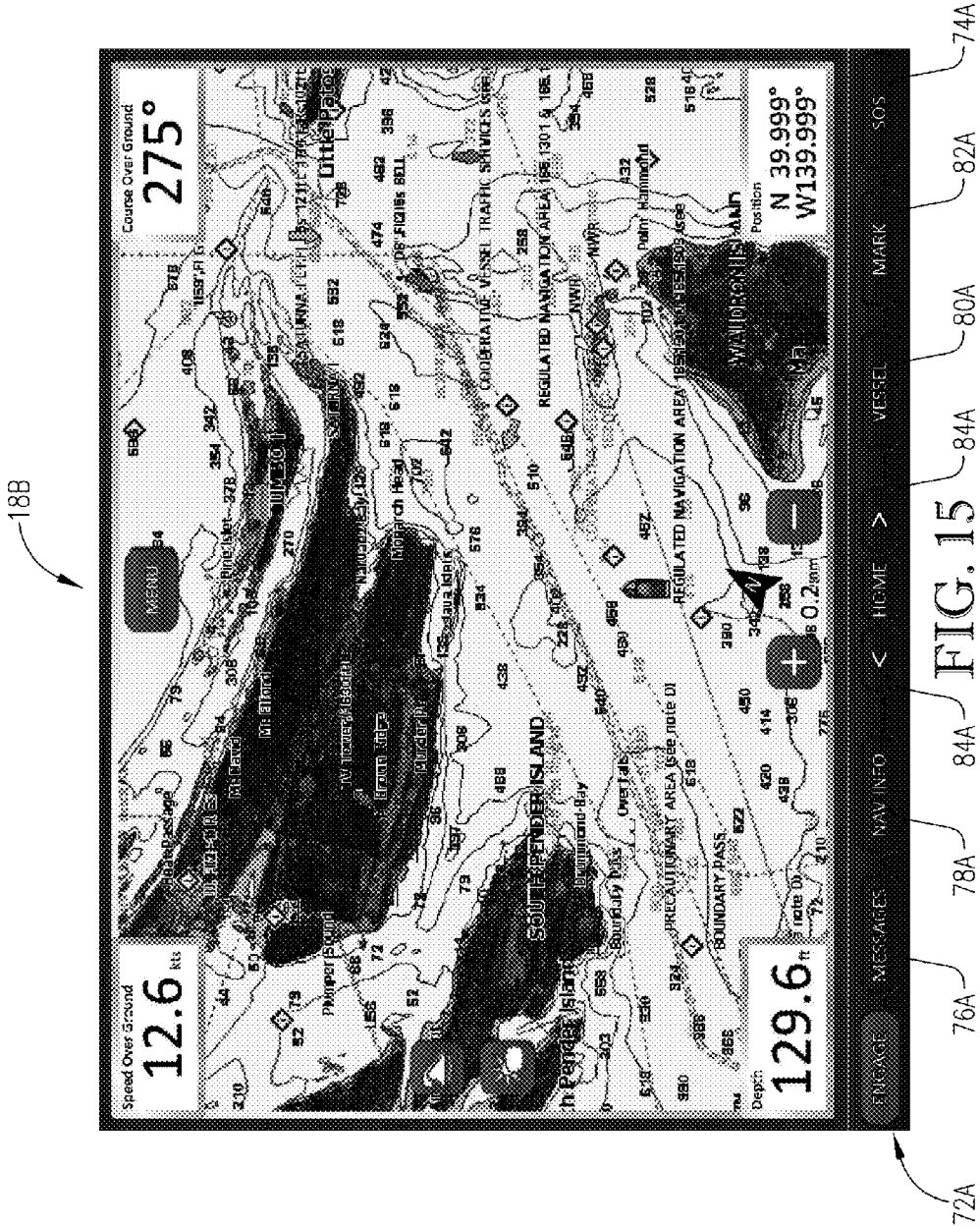
FIG. 15 is an enlarged screen display of a primary control display showing a station control center displayed thereon.

In some embodiments, the processing system 20A displays a station control center 72A on the primary control display as shown in FIG. 15. The station control center 72A implements several useful controls that are commonly used while operating the display station.

The specific controls in the station control center 72A may vary for each installation or station configuration, but certain controls are desired for most applications. In one embodiment, the station control center 72A includes an emergency button 74A or icon that may be labeled "SOS" or something similar. This provides a pop-up menu of common ship emergencies and allows the user to select the nature of a specific emergency. The display system 10 also provides the user with guidance for precautions to be taken and activities to avoid for the type of emergency selected. In some embodiments, the guidance may be step-by-step instructions of how to properly address an emergency. For example, guidance may include instructions about how to rescue a man overboard, place a distress call on an integrated or external VHF radio, provide CPR, etc. If the processing system 20A detects the presence of a radio capable of being set up for digital selective calling (DSC) calls, it shall be prepared to make the call and provides information on the display 18B to instruct the user in how to complete the call. All other devices connected with or in communication with the display system 10A shall similarly be configured according to the nature of the emergency. The SOS button 74A may provide information for any emergency including: general distress, fire, flooding, collision, grounding, capsizing, sinking, adrift abandoning, piracy, and man overboard.

The station control center 72A may also include a "Messages" button 76A or icon for triggering an Information Center. An embodiment of the display system 10 supports three distinct classifications of information from the Information Center:

i. Alarms. Event that demands immediate attention.
  ii. Warnings. Event that will require attention at some point.
  iii. Messages. Event that is informational only and does not require attention.

The Information Center may display a pop-up interface dialog that provides access to the following system information and interfaces: a list of "active" alarms, warnings, and messages with ability to access details about each; software, map, and other versions for every device on the vessel connected to the display system 10; access to status of all networks and information about network devices; GPS status, signal conditions, and Skyview; weather receiver status, signal conditions, and information a user may need for activation; system diagnostics, faults, exceptions, etc.; and/or access to a unified interface for all types of user-adjustable alarms to facilitate review and/or setup.

The station control center 72A may also include a "NAV INFO" button 78A or icon for triggering a Navigator's Library. The Navigator's Library provides access to information and interfaces related to boating in general as opposed to the system information accessed via the Information Center. The NAV INFO button 78A may enable a pop-up dialog that provides access to a variety of tools and "dashboards" commonly used for vessel navigation functions. An embodiment of the Navigator's Library may provide access to information related to the following functions and features: tides, currents, celestial data; planning charts; weather charts; active track recording and track log management; user data management; fuel management; trip computer; historical/performance data (logs, graphs, statistics . . . ).

The station control center 72A may also include a "Vessel" button 80A or icon that provides an interface to all of the installation, layout configuration, network setup and installation, vessel information, and user preference interfaces of the marine display system 10. These interfaces may be designed to be lockable by the layout designer.

The station control center 72A may also include a "Mark" button 82A or icon that may be used to mark the marine vessel's 12 current geographic coordinates as a new waypoint. This interface allows for automatic naming and provides means for user naming and other user waypoint preferences. The Mark button 82A is particularly useful for Man-Overboard situations. Accidental pressing of Mark can quickly litter a map with "junk" waypoints for users who don't know what this feature is and don't know how to use it. Therefore, the Mark button 82A may be omitted as part of a layout configuration.

The display system 10 may also support its own complete autopilot interface. This "virtual" interface may not always be visible or directly accessible to the user of the display system 10. Therefore, access to an unobstructed Standby/Engage button as part of the station control center 72A facilitates safe autopilot operation. An Autopilot Standby/Engage button shall only be available on the station control center 72A if an autopilot control device (such as Garmin's GHC10) is detected or if autopilot control has been set up in any of the layout configurations for a particular station. If autopilot control is configured in any layout at the station, the Autopilot Standby/Engage button may be presented on the station control center for that station. Stations that have not been configured for full autopilot control shall be assumed to have been designed for hard device interface or they reside at a location on the vessel at which there is no manual steering control available when the autopilot is disengaged (which would be a dangerous place to allow the autopilot to be disengaged). With this in consideration, an Autopilot Standby/Engage button shall only appear by default on the station control center of stations for which the virtual autopilot control interface has been configured.

The station control center 72A may also include an interface or button 84A for changing the layout of an operating mode screen or the layout of the display station. The button allows an operator to optimize the installation of the display system for larger boats when the operator desires the experience of having a dedicated hard display for each function of an operating mode. The layout selection button or buttons 84A may be labeled "next", "previous", "list" or include back and forward arrows or something similar. This button or buttons may switch between "pages" of a particular operating mode or between several operating modes.

As with the display system 10, the display system 10A may be used to display information for any of the above-described operating modes. An operator or other user may operate the touchscreen display of the primary control display 18B, remote input device 28 as shown in FIG. 5, or other mode selector 22A to quickly select one of the operating modes to present information related to the operating mode. The user may then manipulate the elements identified above to switch to a different operating mode.

Figure 10:
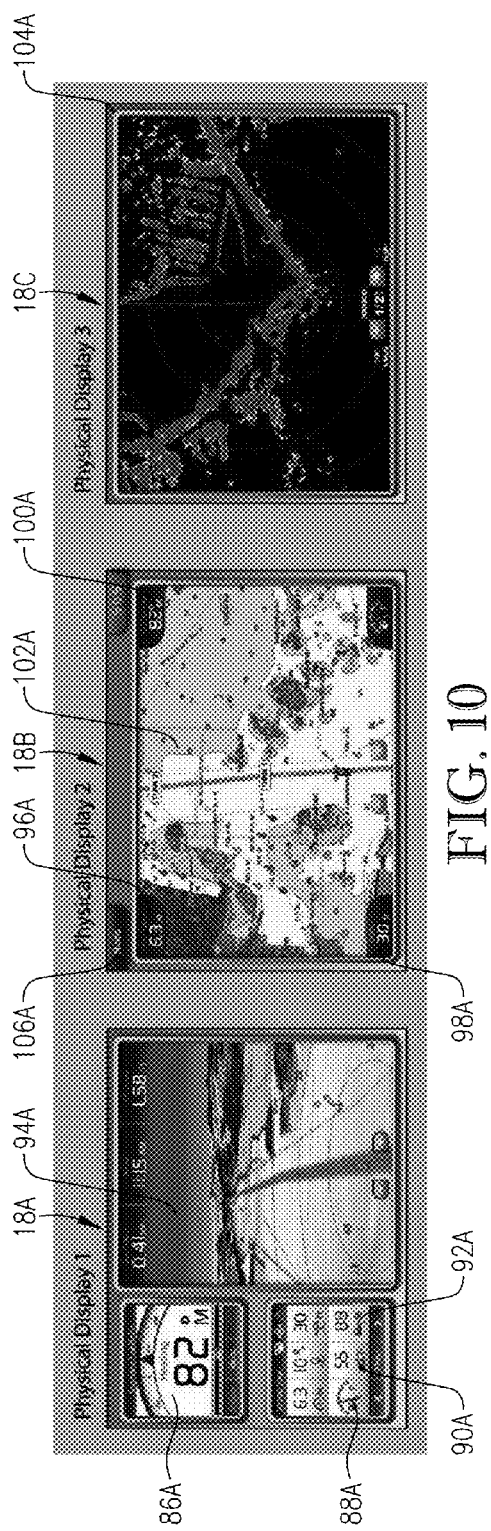
FIG. 10 shows three exemplary screen displays on three displays that make up a display station of the marine vessel display system of FIG. 2.

FIG. 10 depicts the display system 10A with a Main Transit or Navigation mode depicted on the three displays 18A-C. As described above, this operating mode may display several virtual devices as well as textual and graphical information. For example, the operating mode may present a virtual compass 86A or other heading instrument, a virtual fuel gauge 88A, a virtual engine temperature indicator 90A, a virtual fuel level indicator 92A, a cartographic map 94A, and other indicators on the first display 18A. The mode may also present a boat speed indicator 96A, a water depth indicator 98A, a GPS heading indictor 100A, and another cartographic map 102A on one or more displays 18A-C. Finally, the mode may present a radar map 104A and other indicators on the third display 18C.

Figure 11:
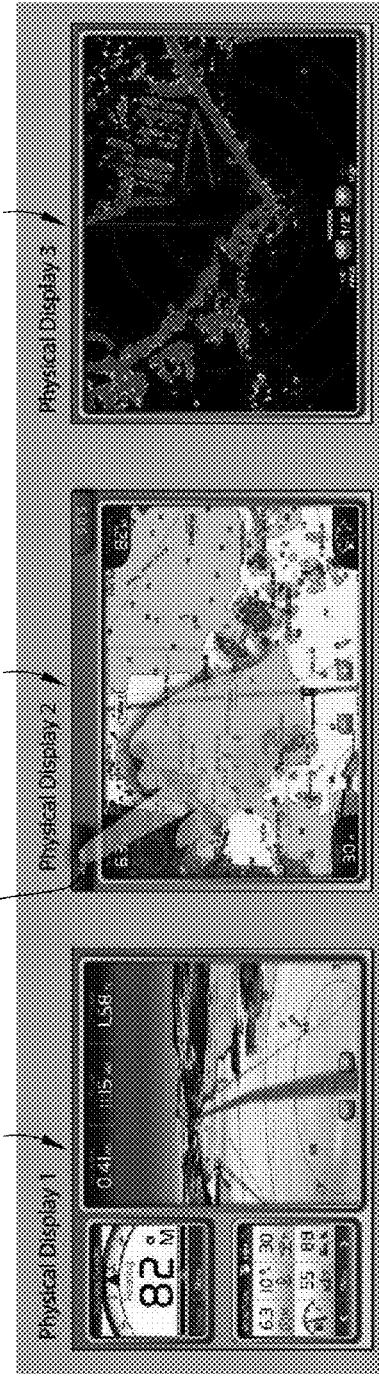
FIG. 11 shows three different screen displays on the display station of FIG. 10.
Figure 12:
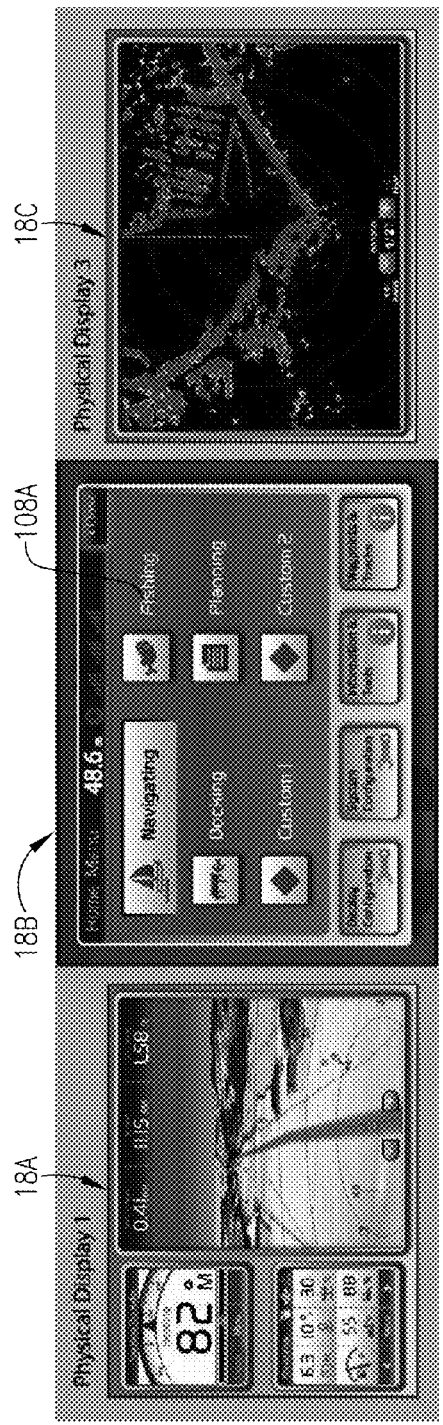
FIG. 12 shows three additional screen displays on the display station of FIG. 10.
Figure 13:
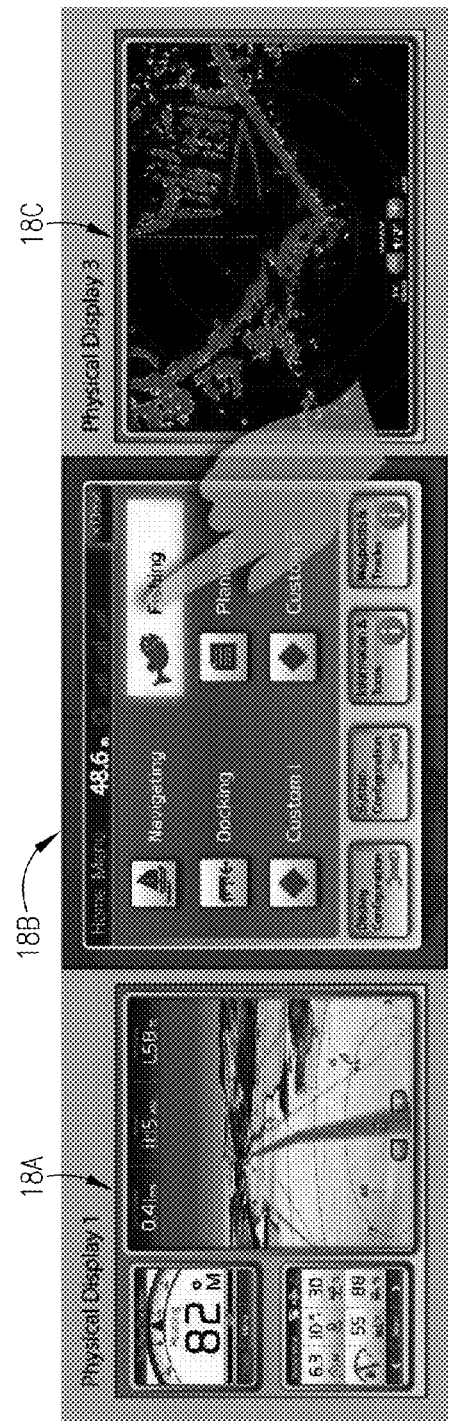
FIG. 13 shows three additional screen displays on the display station of FIG. 10.
Figure 14:
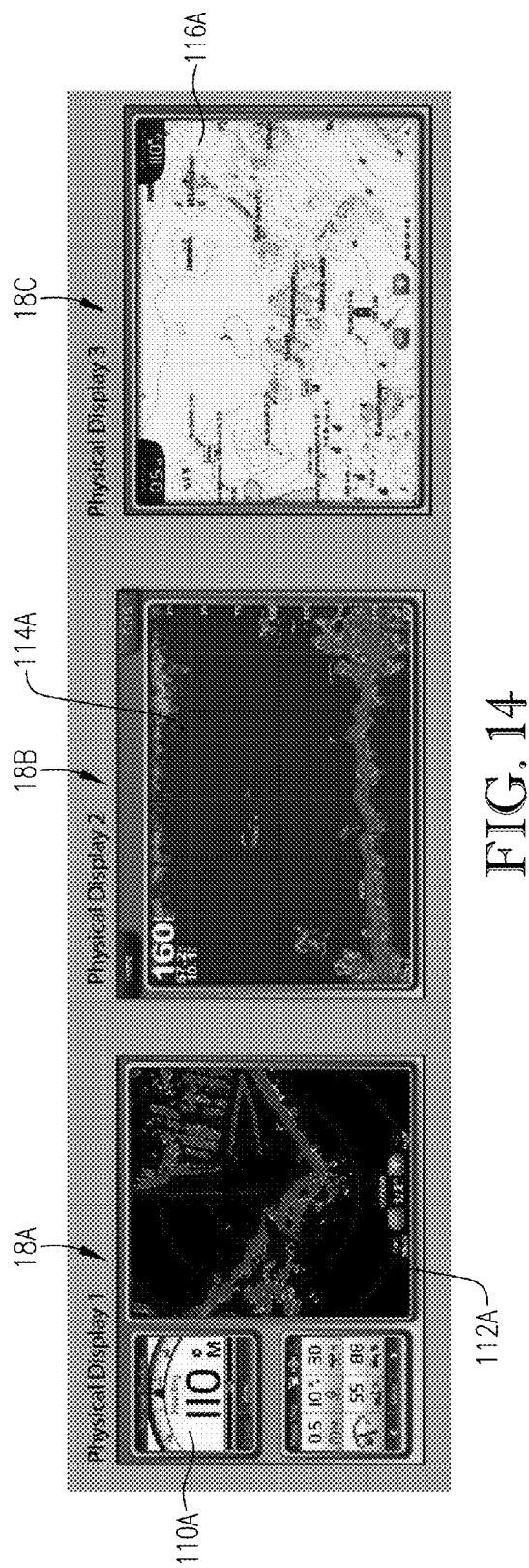
FIG. 14 shows three additional screen displays on the display station of FIG. 10.

To switch to a different operating mode, the user may access a mode selector 22 on a display 18. In some embodiments, the user may press a "Home" button 106A, icon, or other input on the primary display 18B as shown in FIG. 11. This presents a mode selector screen 108A on the primary control display 18B as show in FIG. 12. The user may then operate or manipulate the mode selector 22 to select an operating mode, such as the fishing mode as shown in FIG. 13 to cause the displays 18A-C to present information tailored to a fishing mode as shown in FIG. 14. In the fishing mode, the display 18A may present a virtual heading indicator 110A, a radar screen 112A and other information; the display 18B may present a fishfinder display 114A; and the display 18C may present a cartographic may 116A and other information. In some embodiments, the display 18A may also present a boat speed indicator, a leading indicator, a fuel level indicator, and an engine RPM indicator.

The above-described embodiments and other embodiments of the display system 10, 10A may also include other features. For example, the processing system 20, 20A may automatically detect all input sources, output devices, and other devices connected to the display system 10 and provide a list of these devices to be used for configuration and set-up purposes. The processing system 20 may also allow a user to assign certain input sources 16, 16A to each display station so that information communicated from some of the input sources is only displayed on the certain designated display stations. For example, the display stations may be configured so that sonar information is presented on some of the display stations but not all of them. Similarly, the display stations maybe configured to enable only specified operating modes. For example, a fishing mode may be accessed from a first display station but not a second one.

The processing system 20, 20A may also allow an installer or configuration person to create custom layouts for the operating modes. An installer and/or designer may, for example, select the size, position, and name of all buttons, virtual devices, etc for each operating mode.

Although the technology has been described with reference to the embodiments illustrated in the attached drawing figures, equivalents may be employed and substitutions made herein without departing from the scope of the technology as recited in the claims. For example, the components described herein need not be physically connected to one another since wireless communication among the various depicted components is permissible and intended to fall within the scope of the present invention. Components illustrated and described herein are merely examples of a device and components that may be used to implement the embodiments of the present invention and may be replaced with other devices and components without departing from the scope of the invention.

Although the invention has been described with reference to the preferred embodiment illustrated in the attached drawing figures, it is noted that equivalents may be employed and substitutions made herein without departing from the scope of the invention as recited in the claims.

What is claimed is:

1. An electronic display system for a marine vessel, the display system comprising:
   a first display station configured to be mounted at a first location in the marine vessel, the first display station comprising:
      a plurality of displays each including a processing system operable to implement a plurality of modes of operation that vary by activity type;
      a mode selector screen including two or more selectable modes of operation of the plurality of modes of operation presented on at least one of the plurality of displays of the first display station for permitting a user to select a first mode of operation associated with a first activity, wherein the processing system of the display presenting the mode selector screen causes all of the displays in the first display station to present predetermined information related to the selected first mode of operation and each display of the first display station presenting different information than the other displays of the first display station; and an input for receiving data from a plurality of input sources, wherein the processing system of the display presenting the mode selector screen causes all of the displays in the first display station to present the respective predetermined information representative of the data from selected input sources of the plurality of input sources for each of the plurality of modes of operation;

wherein the representative predetermined information related to the selected first mode of operation includes a water depth indicator, a cartographic map, and a sonar display.

2. The electronic display system as set forth in claim 1, wherein the display system further comprises:

a second display station configured to be mounted at a second location of the marine vessel, the second display station comprising:

a display;

a processing system coupled with the display and operable to implement the plurality of modes of operation; and a mode selector screen including two or more selectable modes of operation of the plurality of modes of operation presented on the display of the second display station for permitting the user to select a second mode of operation associated with a second activity, the second mode of operation and the second activity being different from the first mode of operation and the first activity, wherein the processing system of the second display station causes the display to present predetermined information related to the selected second mode of operation.

3. The electronic display system as set forth in claim 2, wherein the display of the second display station includes a touchscreen user interface.

4. The electronic display system as set forth in claim 3, wherein the processing system of the second display station causes the mode selector screen of the second display station to be presented on the touchscreen user interface of the display for the second display station.

5. The electronic display system as set forth in claim 2, wherein the mode selector screen for the first display station is operable to cause the display in the second display station to present information related to the selected first mode of operation.

6. The electronic display system as set forth in claim 2, wherein the mode selector screen for the second display station is operable to cause all of the plurality of displays in the first display station to present information related to the selected second mode of operation.

7. The electronic display system as set forth in claim 2, wherein the processing system of each of the plurality of displays of the first display station implements at least one mode of operation that is not implemented by the processing system of the second display station.

8. The electronic display system as set forth in claim 2, wherein the selected first mode of operation for the first display station is not the same as the selected second mode of operation for the second display station.

9. The electronic display system as set forth in claim 2, wherein the mode selector screen for the first display station is integrated with the mode selector screen for the second display station.

10. The electronic display system as set forth in claim 1, wherein one of the displays of the first display station is designated as a primary control display and the primary control display includes a touchscreen user interface.

11. The electronic display system as set forth in claim 10, wherein the mode selector screen is presented on the primary control display.

12. The electronic display system as set forth in claim 1, wherein the input sources comprise a fish finder for providing fish finder data, and the two or more selectable modes of operation comprise a fishing mode in which information representative of the fish finder data is presented by the first display station.

13. The electronic display system as set forth in claim 1, wherein the input sources comprise a computer, the data comprises trip planning data, and the two or more selectable modes of operation comprise a pre-trip-planning mode in which information representative of the trip planning data is presented by each display of the first display station.

14. The electronic display system as set forth in claim 1, wherein the input sources comprise a proximity sensor for providing proximity data, a wind sensor for providing wind data, a current sensor for providing water current data, a rudder position sensor for providing rudder position data, video camera for providing video data, and an azimuth thruster position sensor for providing azimuth thruster position data, and one of the plurality of modes of operation comprise a docking/undocking mode in which information representative of the proximity data, wind data, water current data, rudder position data, video data, and azimuth thruster position data is presented by the first display station.

15. The electronic display system as set forth in claim 1, wherein the input sources comprise a fuel level sensor for providing fuel level data, a position determining component for providing geographic position data, and a weather source for providing weather data, and one of the plurality of modes of operation comprise a main transit mode in which information representative of the fuel level data, geographic position data, and weather data is presented by the first display station.

16. The electronic display system as set forth in claim 15, wherein the input sources further comprise a proximity sensor for providing proximity data; a depth sensor for providing water depth data; a water storage sensor for providing water storage data; a speed sensor for providing speed data; an anchor sensor for providing anchor status data; one or more personnel location sensors for providing personnel location data; a security system for providing security data; a camera for providing photographic data; and a bilge level sensor for providing bilge water level data.

17. The electronic display system as set forth in claim 16, wherein the plurality of modes of operation further comprise a boat preparation mode in which information representative of the water storage data and fuel level data is presented by the first display station; a close quarters mode in which information representative of the proximity data is presented by the first display station; an anchoring mode in which information representative of the anchor status data is presented by the first display station; an off-boat monitoring mode in which information representative of the security data is presented by the first display station; a boat storage and transport mode in which information representative of the photographic data is presented by the first display station; a man-overboard mode in which information representative of the personnel location data is presented by the first display station; and a hazard hit mode in which information representative of the bilge water level data is presented by the first display station.

18. The electronic display system as set forth in claim 1, wherein the mode selector screen includes a plurality of icons or textual descriptions associated with each of the two or more selectable modes of operation.

19. The electronic display system as set forth in claim 1, wherein the respective predetermined information presented on each display of the first display station is displayed based on a user-selected format.

20. The electronic display system as set forth in claim 1, wherein the processing system of at least one display of the first display station determines assignment of at least one input source for each display based on signals received from a touchscreen user interface.

21. The electronic display system as set forth in claim 20, wherein the determined assignments of input sources is stored as a custom layout in a memory of at least one display of the first display station.

22. The electronic display system as set forth in claim 1, wherein operating mode settings for the first display station are automatically transferred to all displays of the first display station upon reconfiguration.

23. An electronic display system for a marine vessel, the display system comprising:
  a first display station configured to be mounted at a first location in the marine vessel, the first display station comprising a plurality of displays, each display comprising a processing system operable to control the respective display to implement a plurality of modes of operation that vary by activity type and presenting predetermined information that is not presented on the other displays of the first display station;
  a second display station configured to be mounted at a second location of the marine vessel, the second display station comprising at least one display and at least one processing system operable to control the at least one display to implement the plurality of modes of operation;
  a mode selector including two or more selectable modes of operation of the plurality of modes of operation coupled with at least one processing system of the plurality of displays in the first display station for permitting a user to select one of the two or more selectable modes of operation, wherein the at least one processing system of the plurality of displays in the first display station coupled with the mode selector causes all of the displays in the first display station to present the respective predetermined information related to the selected mode of operation; and
  an input for receiving data from a plurality of input sources, the input sources comprising a fish finder for providing fish finder data, wherein all of the displays in the first display station present the respective predetermined information representative of the data from selected input sources of the plurality of input sources for each of the plurality of modes of operation;
  wherein the selected mode of operation is a fishing mode in which information representative of the fish finder data includes a water depth indicator and a sonar display presented by one display of the first display station.

24. The electronic display system of claim 23, wherein the mode selector is a mode selector screen including the two or more selectable modes of operation presented on at least one display of the first display station.

25. The electronic display system of claim 24, wherein the mode selector screen includes a plurality of icons or textual descriptions associated with each of the two or more selectable modes of operation.

26. The electronic display system of claim 23, wherein the selected mode of operation presents predetermined information representative of the data from a selected input source.

27. The electronic display system of claim 23, wherein the mode selector is a remote input device.

* * * * *